United States Patent
Epstein et al.

(10) Patent No.: US 9,701,416 B2
(45) Date of Patent: Jul. 11, 2017

(54) AIRCRAFT AND A RETROFIT CRYOGENIC FUEL SYSTEM

(71) Applicant: General Electric Company, Schenectady, NY (US)

(72) Inventors: Michael Jay Epstein, Cincinnati, OH (US); Paul Bernard Stumbo, Cincinnati, OH (US); Robert Harold Weisgerber, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 144 days.

(21) Appl. No.: 14/655,761

(22) PCT Filed: Nov. 26, 2013

(86) PCT No.: PCT/US2013/071836
§ 371 (c)(1),
(2) Date: Jun. 26, 2015

(87) PCT Pub. No.: WO2014/105335
PCT Pub. Date: Jul. 3, 2014

(65) Prior Publication Data
US 2015/0344145 A1    Dec. 3, 2015

Related U.S. Application Data

(60) Provisional application No. 61/747,171, filed on Dec. 28, 2012, provisional application No. 61/746,930, filed on Dec. 28, 2012.

(51) Int. Cl.
*B64D 37/32*     (2006.01)
*B64D 37/30*     (2006.01)
(Continued)

(52) U.S. Cl.
CPC .............. *B64D 37/30* (2013.01); *B64D 37/32* (2013.01); *F02C 7/14* (2013.01); *F02C 7/224* (2013.01);
(Continued)

(58) Field of Classification Search
CPC ........ B64D 37/24; B64D 37/30; B64D 37/32; F02C 9/40
See application file for complete search history.

(56) References Cited

U.S. PATENT DOCUMENTS 4,378,920 A * 4/1983 Runnels ................. B64D 37/32
                                                        137/209
4,508,548 A * 4/1985 Manatt ..................... A62B 7/14
                                                         96/8

(Continued)

FOREIGN PATENT DOCUMENTS

CN          101006302 A       7/2007
CN          101068716 A      11/2007
(Continued)

OTHER PUBLICATIONS

U.S. Appl. No. 61/747,171, filed Dec. 28, 2012, Mehdi Milani Baladi et al.
(Continued)

*Primary Examiner* — Nicholas McFall
(74) *Attorney, Agent, or Firm* — Peter A. Flynn

(57) ABSTRACT

An aircraft having a turbine engine having a bleed air output line, a cryogenic fuel system having a cryogenic fuel tank for storing cryogenic fuel and a supply line operably coupling the tank to the turbine engine, and an on board inert gas generating system (OBIGGS) fluidly coupled to the bleed air output and having a nitrogen rich stream output line and an oxygen rich stream output line.

18 Claims, 10 Drawing Sheets

(51) Int. Cl.
  *F17C 3/00* (2006.01)
  *F02C 7/14* (2006.01)
  *F02C 7/224* (2006.01)
  *F02C 9/40* (2006.01)

(52) U.S. Cl.
  CPC .................. *F02C 9/40* (2013.01); *F17C 3/00* (2013.01); *F05D 2260/213* (2013.01); *F05D 2260/98* (2013.01); *Y02T 50/44* (2013.01); *Y02T 50/672* (2013.01); *Y02T 50/676* (2013.01); *Y02T 90/44* (2013.01)

(56) References Cited

U.S. PATENT DOCUMENTS

| | | |
|---|---|---|
| 7,954,753 B2 | 6/2011 | Hoffjann et al. |
| 8,623,566 B2 | 1/2014 | Westenberger et al. |
| 2007/0199941 A1 | 8/2007 | Reese |
| 2008/0060523 A1 | 3/2008 | Tom |
| 2008/0209917 A1 | 9/2008 | Adler |
| 2011/0041307 A1* | 2/2011 | Westenberger ........... F17C 1/00 29/402.08 |
| 2011/0062288 A1 | 3/2011 | Cremers |

FOREIGN PATENT DOCUMENTS

| | | |
|---|---|---|
| CN | 101933187 A | 12/2010 |
| WO | 2012045028 A1 | 4/2012 |
| WO | 2012045035 A2 | 4/2012 |

OTHER PUBLICATIONS

Unofficial English Translation of Chinese Office Action issued in connection with corresponding CN Application No. 201380068561.9 on Dec. 30, 2015.

International Search Report and Written Opinion issued in connection with corresponding PCT application PCT/US13/071836 dated Feb. 24, 2014.

"Tupolev TU-155" In: Yefim Gordon, Bill Gunston: "Soviet X-Planes", Dec. 31, 2000 (Dec. 31, 2000), Midland Publishing, Leicester, England, XP055102363, ISBN:1857899990.

* cited by examiner

AIRCRAFT AND A RETROFIT CRYOGENIC FUEL SYSTEM

CROSS REFERENCE TO RELATED APPLICATIONS

This is a national stage application under 35 U.S.C. §371(c) of prior-filed, PCT application serial number PCT/US2013/071836, filed on Nov. 26, 2013, which claims the benefit of U.S. Provisional Patent Application Nos. 61/746,930 and 61/747,171, both filed on Dec. 28, 2012. These applications are incorporated herein in their entirety.

BACKGROUND OF THE INVENTION

The technology described herein relates generally to aircraft systems, and more specifically to aircraft systems using dual fuels in an aviation gas turbine engine and a method of operating same.

Certain cryogenic fuels such as liquefied natural gas (LNG) may be cheaper than conventional jet fuels. Current approaches to cooling in conventional gas turbine applications use compressed air or conventional liquid fuel. Use of compressor air for cooling may lower efficiency of the engine system.

Accordingly, it would be desirable to have aircraft systems using dual fuels in an aviation gas turbine engine. It would be desirable to have aircraft systems that can be propelled by aviation gas turbine engines that can be operated using conventional jet fuel and/or cheaper cryogenic fuels such as liquefied natural gas (LNG). It would be desirable to have more efficient cooling in aviation gas turbine components and systems. It would be desirable to have improved efficiency and lower Specific Fuel Consumption in the engine to lower the operating costs. It is desirable to have aviation gas turbine engines using dual fuels that may reduce environmental impact with lower greenhouse gases (CO2), oxides of nitrogen—NOx, carbon monoxide—CO, unburned hydrocarbons and smoke.

BRIEF DESCRIPTION OF EMBODIMENTS OF THE INVENTION

In one aspect, an embodiment of the invention relates to an aircraft, having a turbine engine having a bleed air output line, a cryogenic fuel system having a cryogenic fuel tank for storing cryogenic fuel and a supply line operably coupling the tank to the turbine engine, and an on board inert gas generating system (OBIGGS) fluidly coupled to the bleed air output and having a nitrogen rich stream output line and an oxygen rich stream output line.

In another aspect, an embodiment of the invention relates to a retrofit cryogenic fuel system for an aircraft having a cargo bay and a turbine engine fueled by the cryogenic fuel, including an evacuated enclosure configured to be received within the cargo bay, a cryogenic fuel tank located within the evacuated enclosure, and at least one vent line or fuel supply line fluidly coupled to the evacuated enclosure.

BRIEF DESCRIPTION OF THE DRAWINGS

The technology described herein may be best understood by reference to the following description taken in conjunction with the accompanying drawing figures in which.

DESCRIPTION OF EMBODIMENTS OF THE INVENTION

Figure 1:
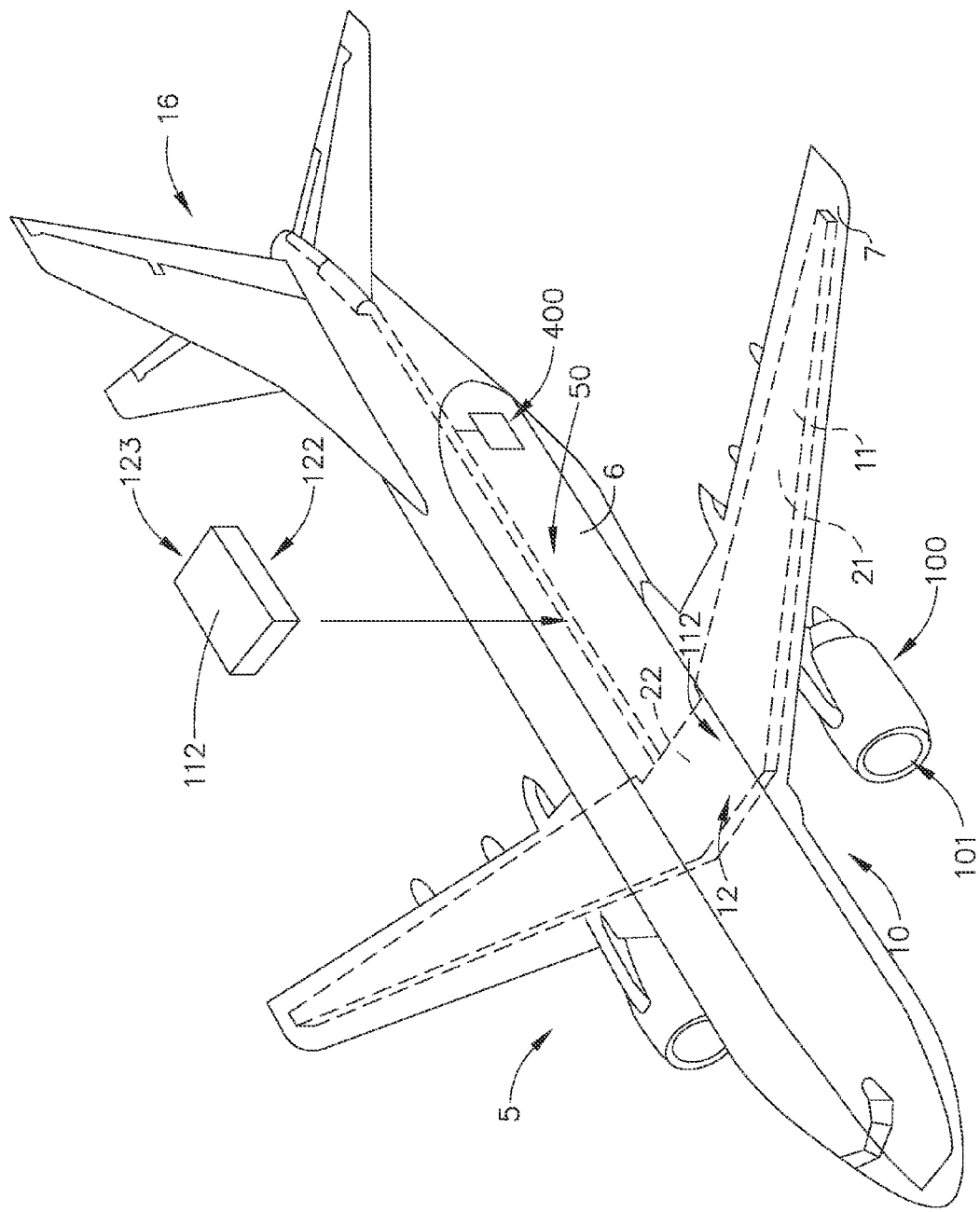
FIG. 1 is an isometric view of an exemplary aircraft system having a dual fuel propulsion system.

Referring to the drawings herein, identical reference numerals denote the same elements throughout the various views.

FIG. 1 shows an aircraft system 5 according to an exemplary embodiment of the present invention. The exemplary aircraft system 5 has a fuselage 6 and wings 7 attached to the fuselage. The aircraft system 5 has a propulsion system 100 that produces the propulsive thrust required to propel the aircraft system in flight. Although the propulsion system 100 is shown attached to the wing 7 in FIG. 1, in other embodiments it may be coupled to other parts of the aircraft system 5, such as, for example, the tail portion 16.

The exemplary aircraft system 5 has a fuel storage system 10 for storing one or more types of fuels that are used in the propulsion system 100. The exemplary aircraft system 5 shown in FIG. 1 uses two types of fuels, as explained further below herein. Accordingly, the exemplary aircraft system 5 comprises a first fuel tank 21 capable of storing a first fuel 11 and a second fuel tank 22 capable of storing a second fuel 12. In the exemplary aircraft system 5 shown in FIG. 1, at least a portion of the first fuel tank 21 is located in a wing 7 of the aircraft system 5. In one exemplary embodiment, shown in FIG. 1, the second fuel tank 22 is located in the fuselage 6 of the aircraft system near the location where the wings are coupled to the fuselage. In alternative embodiments, the second fuel tank 22 may be located at other suitable locations in the fuselage 6 or the wing 7. In other embodiments, the aircraft system 5 may comprise an optional third fuel tank 123 capable of storing the second fuel 12. The optional third fuel tank 123 may be located in an aft portion of the fuselage of the aircraft system, such as for example shown schematically in FIG. 1.

As further described later herein, the propulsion system 100 shown in FIG. 1 is a dual fuel propulsion system that is capable of generating propulsive thrust by using the first fuel 11 or the second fuel 12 or using both first fuel 11 and the second fuel 12. The exemplary dual fuel propulsion system 100 comprises a gas turbine engine 101 capable of generating a propulsive thrust selectively using the first fuel 11, or the second fuel 21, or using both the first fuel and the second fuel at selected proportions. The first fuel may be a conventional liquid fuel such as a kerosene based jet fuel such as known in the art as Jet-A, JP-8, or JP-5 or other known types or grades. In the exemplary embodiments described herein, the second fuel 12 is a cryogenic fuel that is stored at very low temperatures. In one embodiment described herein, the cryogenic second fuel 12 is Liquefied Natural Gas (alternatively referred to herein as "LNG"). The cryogenic second fuel 12 is stored in the fuel tank at a low temperature. For example, the LNG is stored in the second fuel tank 22 at about −265° F. at an absolute pressure of about 15 psia. The fuel tanks may be made from known materials such as titanium, Inconel, aluminum or composite materials.

The exemplary aircraft system 5 shown in FIG. 1 comprises a fuel delivery system 50 capable of delivering a fuel from the fuel storage system 10 to the propulsion system 100. Known fuel delivery systems may be used for delivering the conventional liquid fuel, such as the first fuel 11. In the exemplary embodiments described herein, and shown in FIGS. 1 and 2, the fuel delivery system 50 is configured to deliver a cryogenic liquid fuel, such as, for example, LNG, to the propulsion system 100 through conduits 54 that transport the cryogenic fuel. In order to substantially maintain a liquid state of the cryogenic fuel during delivery, at least a portion of the conduit 54 of the fuel delivery system 50 is insulated and configured for transporting a pressurized cryogenic liquid fuel. In some exemplary embodiments, at least a portion of the conduit 54 has a double wall construction. The conduits may be made from known materials such as titanium, Inconel, aluminum or composite materials.

The exemplary embodiment of the aircraft system 5 shown in FIG. 1 further includes a fuel cell system 400, comprising a fuel cell capable of producing electrical power using at least one of the first fuel 11 or the second fuel 12. The fuel delivery system 50 is capable of delivering a fuel from the fuel storage system 10 to the fuel cell system 400. In one exemplary embodiment, the fuel cell system 400 generates power using a portion of a cryogenic fuel 12 used by a dual fuel propulsion system 100.

Figure 4:
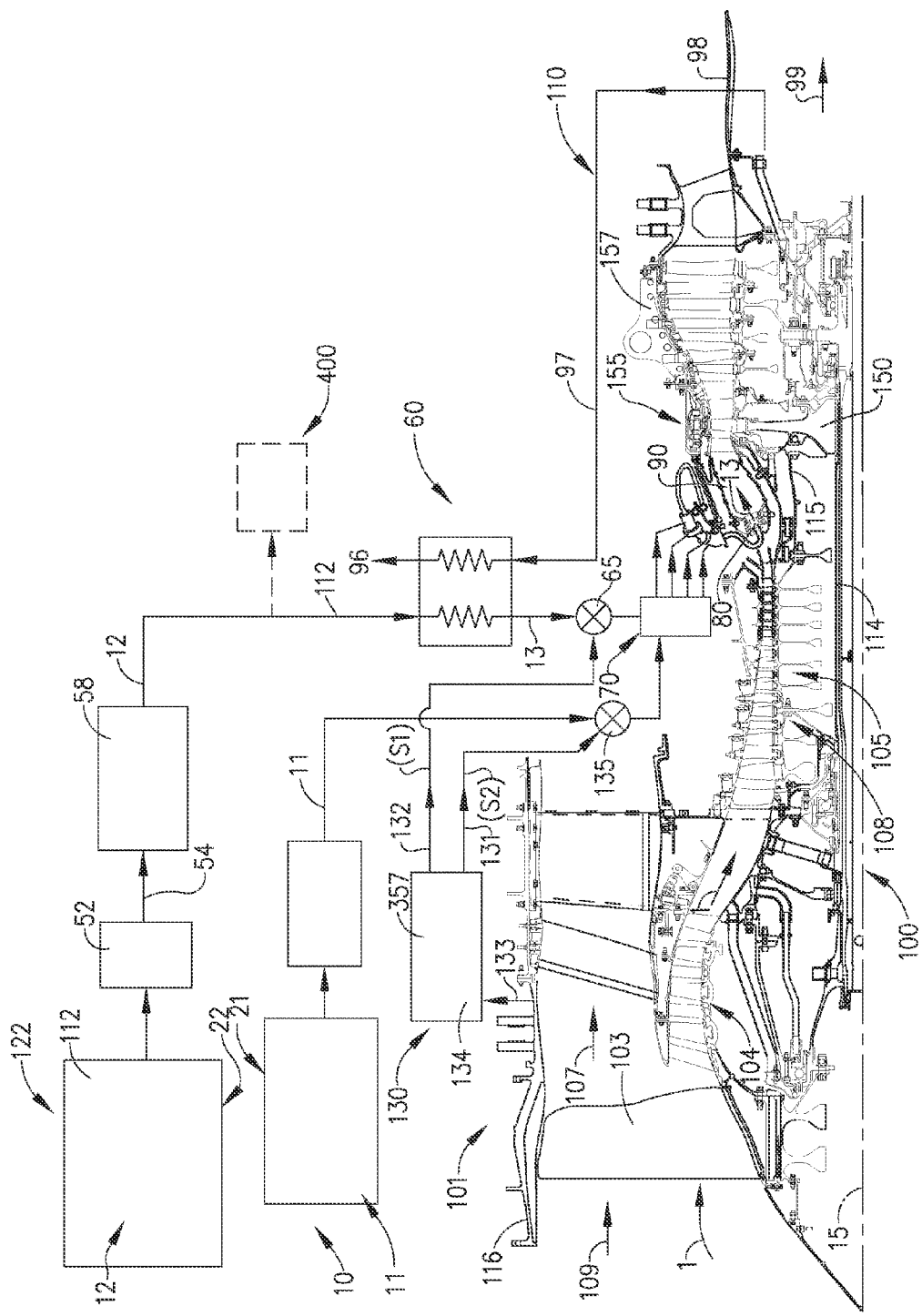
FIG. 4 is a schematic cross-sectional view of an exemplary dual fuel aircraft gas turbine engine having a fuel delivery and control system.

The propulsion system 100 comprises a gas turbine engine 101 that generates the propulsive thrust by burning a fuel in a combustor. FIG. 4 is a schematic view of an exemplary gas turbine engine 101 including a fan 103 and a core engine 108 having a high pressure compressor 105, and a combustor 90. Engine 101 also includes a high pressure turbine 155, a low pressure turbine 157, and a booster 104. The exemplary gas turbine engine 101 has a fan 103 that produces at least a portion of the propulsive thrust. Engine 101 has an intake side 109 and an exhaust side 110. Fan 103 and turbine 157 are coupled together using a first rotor shaft 114, and compressor 105 and turbine 155 are coupled together using a second rotor shaft 115. In some applications, such as, for example, shown in FIG. 4, the fan 103 blade assemblies are at least partially positioned within an engine casing 116. In other applications, the fan 103 may form a portion of an "open rotor" where there is no casing surrounding the fan blade assembly.

During operation, air flows axially through fan 103, in a direction that is substantially parallel to a central line axis 15 extending through engine 101, and compressed air is supplied to high pressure compressor 105. The highly compressed air is delivered to combustor 90. Hot gases (not shown in FIG. 4) from combustor 90 drives turbines 155 and 157. Turbine 157 drives fan 103 by way of shaft 114 and similarly, turbine 155 drives compressor 105 by way of shaft 115. In alternative embodiments, the engine 101 may have an additional compressor, sometimes known in the art as an intermediate pressure compressor, driven by another turbine stage (not shown in FIG. 4).

During operation of the aircraft system 5 (See exemplary flight profile shown in FIG. 7), the gas turbine engine 101 in the propulsion system 100 may use, for example, the first fuel 11 during a first selected portion of operation of propulsion system, such as for example, during take off. The propulsion system 100 may use the second fuel 12, such as, for example, LNG, during a second selected portion of operation of propulsion system such as during cruise. Alternatively, during selected portions of the operation of the aircraft system 5, the gas turbine engine 101 is capable of generating the propulsive thrust using both the first fuel 11 and the second fuel 12 simultaneously. The proportion of the first fuel and second fuel may be varied between 0% to 100% as appropriate during various stages of the operation of the propulsion system.

An aircraft and engine system, described herein, is capable of operation using two fuels, one of which may be a cryogenic fuel such as for example, LNG (liquefied natural gas), the other a conventional kerosene based jet fuel such as Jet-A, JP-8, JP-5 or similar grades available worldwide.

The Jet-A fuel system is similar to conventional aircraft fuel systems, with the exception of the fuel nozzles, which are capable of firing Jet-A and cryogenic/LNG to the combustor in proportions from 0-100%. In the embodiment shown in FIG. 1, the LNG system includes a fuel tank, which optionally contains the following features: (i) vent lines with appropriate check valves to maintain a specified pressure in the tank; (ii) drain lines for the liquid cryogenic fuel; (iii) gauging or other measurement capability to assess the temperature, pressure, and volume of cryogenic (LNG) fuel present in the tank; (iv) a boost pump located in the cryogenic (LNG) tank or optionally outside of the tank, which increases the pressure of the cryogenic (LNG) fuel to transport it to the engine; and (iv) an optional cryo-cooler to keep the tank at cryogenic temperatures indefinitely.

In an embodiment, the fuel tank will operate at or near atmospheric pressure, but can operate in the range of 0 to 100 psig. Alternative embodiments of the fuel system may include high tank pressures and temperatures. The cryogenic (LNG) fuel lines running from the tank and boost pump to the engine pylons may have the following features: (i) single or double wall construction; (ii) vacuum insulation or low thermal conductivity material insulation; and (iii) an optional cryo-cooler to re-circulate LNG flow to the tank without adding heat to the LNG tank. The cryogenic (LNG) fuel tank can be located in the aircraft where a conventional Jet-A auxiliary fuel tank is located on existing systems, for example, in the forward or aft cargo hold. Alternatively, a cryogenic (LNG) fuel tank can be located in the center wing tank location. An auxiliary fuel tank utilizing cryogenic (LNG) fuel may be designed so that it can be removed if cryogenic (LNG) fuel will not be used for an extended period of time.

A high pressure pump may be located in the pylon or on board the engine to raise the pressure of the cryogenic (LNG) fuel to levels sufficient to inject fuel into the gas turbine combustor. The pump may or may not raise the pressure of the LNG/cryogenic liquid above the critical pressure (Pc) of cryogenic (LNG) fuel. A heat exchanger, referred to herein as a "vaporizer," which may be mounted on or near the engine, adds thermal energy to the liquefied natural gas fuel, raising the temperature and volumetrically expanding the cryogenic (LNG) fuel. Heat (thermal energy) from the vaporizer can come from many sources. These include, but are not limited to: (i) the gas turbine exhaust; (ii) compressor intercooling; (iii) high pressure and/or low pressure turbine clearance control air; (iv) LPT pipe cooling parasitic air; (v) cooled cooling air from the HP turbine; (vi) lubricating oil; or (vii) on board avionics or electronics. The heat exchanger can be of various designs, including shell and tube, double pipe, fin plate, etc., and can flow in a co-current, counter current, or cross current manner. Heat exchange can occur in direct or indirect contact with the heat sources listed above.

A control valve is located downstream of the vaporizer/heat exchange unit described above. The purpose of the control valve is to meter the flow to a specified level into the fuel manifold across the range of operational conditions associated with the gas turbine engine operation. A secondary purpose of the control valve is to act as a back pressure regulator, setting the pressure of the system above the critical pressure of cryogenic (LNG) fuel.

A fuel manifold is located downstream of the control valve, which serves to uniformly distribute gaseous fuel to the gas turbine fuel nozzles. In some embodiments, the manifold can optionally act as a heat exchanger, transferring thermal energy from the core cowl compartment or other thermal surroundings to the cryogenic/LNG/natural gas fuel. A purge manifold system can optionally be employed with the fuel manifold to purge the fuel manifold with compressor air (CDP) when the gaseous fuel system is not in operation. This will prevent hot gas ingestion into the gaseous fuel nozzles due to circumferential pressure variations. Optionally, check valves in or near the fuel nozzles can prevent hot gas ingestion.

An exemplary embodiment of the system described herein may operate as follows: Cryogenic (LNG) fuel is located in the tank at about 15 psia and about −265° F. It is pumped to approximately 30 psi by the boost pump located on the aircraft. Liquid cryogenic (LNG) fuel flows across the wing via insulated double walled piping to the aircraft pylon where it is stepped up to about 100 to 1,500 psia and can be above or below the critical pressure of natural gas/methane. The cryogenic (LNG) fuel is then routed to the vaporizer where it volumetrically expands to a gas. The vaporizer may be sized to keep the Mach number and corresponding pressure losses low. Gaseous natural gas is then metered though a control valve and into the fuel manifold and fuel nozzles where it is combusted in an otherwise standard aviation gas turbine engine system, providing thrust to the airplane. As cycle conditions change, the pressure in the boost pump (about 30 psi for example) and the pressure in the HP pump (about 1,000 psi for example) are maintained at an approximately constant level. Flow is controlled by the metering valve. The variation in flow in combination with the appropriately sized fuel nozzles result in acceptable and varying pressures in the manifold.

The exemplary aircraft system 5 has a fuel delivery system for delivering one or more types of fuels from the storage system 10 for use in the propulsion system 100. For a conventional liquid fuel such as, for example, a kerosene based jet fuel, a conventional fuel delivery system may be used. The exemplary fuel delivery system described herein, and shown schematically in FIGS. 2 and 3, comprises a cryogenic fuel delivery system 50 for an aircraft system 5. The exemplary fuel system 50 shown in FIG. 2 comprises a cryogenic fuel tank 122 capable of storing a cryogenic liquid fuel 112. In one embodiment, the cryogenic liquid fuel 112 is LNG. Other alternative cryogenic liquid fuels may also be used. In the exemplary fuel system 50, the cryogenic liquid fuel 112, such as, for example, LNG, is at a first pressure "P1". In an embodiment, the pressure P1 is close to atmospheric pressure, such as, for example, 15 psia.

The exemplary fuel system 50 has a boost pump 52 such that it is in flow communication with the cryogenic fuel tank 122. During operation, when cryogenic fuel is needed in the dual fuel propulsion system 100, the boost pump 52 removes a portion of the cryogenic liquid fuel 112 from the cryogenic fuel tank 122 and increases its pressure to a second pressure "P2" and flows it into a wing supply conduit 54 located in a wing 7 of the aircraft system 5. The pressure P2 is chosen such that the liquid cryogenic fuel maintains its liquid state (L) during the flow in the supply conduit 54. The pressure P2 may be in the range of about 30 psia to about 40 psia. Based on analysis using known methods, for LNG, 30 psia is found to be adequate. The boost pump 52 may be located at a suitable location in the fuselage 6 of the aircraft system 5. Alternatively, the boost pump 52 may be located close to the cryogenic fuel tank 122. In other embodiments, the boost pump 52 may be located inside the cryogenic fuel tank 122. In order to substantially maintain a liquid state of the cryogenic fuel during delivery, at least a portion of the wing supply conduit 54 is insulated. In some exemplary embodiments, at least a portion of the conduit 54 has a double wall construction. The conduits 54 and the boost pump 52 may be made using known materials such as titanium, Inconel, aluminum or composite materials.

The exemplary fuel system 50 has a high-pressure pump 58 that is in flow communication with the wing supply conduit 54 and is capable of receiving the cryogenic liquid fuel 112 supplied by the boost pump 52. The high-pressure pump 58 increases the pressure of the liquid cryogenic fuel (such as, for example, LNG) to a third pressure "P3" sufficient to inject the fuel into the propulsion system 100. The pressure P3 may be in the range of about 100 psia to about 1000 psia. The high-pressure pump 58 may be located at a suitable location in the aircraft system 5 or the propulsion system 100. In an embodiment, the high-pressure pump 58 is located in a pylon 55 of aircraft system 5 that supports the propulsion system 100.

Figure 2:
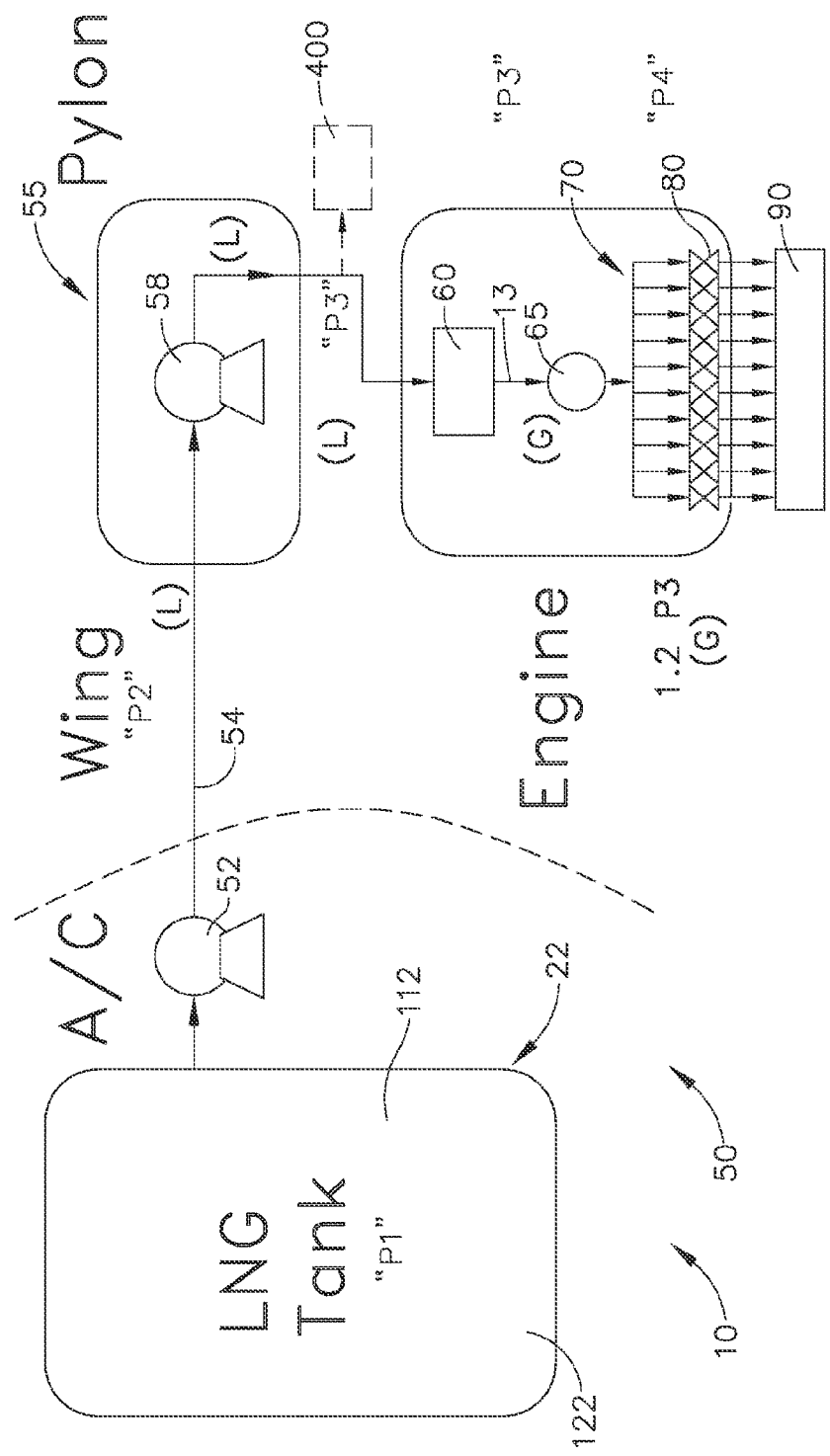
FIG. 2 is an exemplary fuel delivery/distribution system.

As shown in FIG. 2, the exemplary fuel system 50 has a vaporizer 60 for changing the cryogenic liquid fuel 112 into a gaseous (G) fuel 13. The vaporizer 60 receives the high pressure cryogenic liquid fuel and adds heat (thermal energy) to the cryogenic liquid fuel (such as, for example, LNG) raising its temperature and volumetrically expanding it. Heat (thermal energy) can be supplied from one or more sources in the propulsion system 100. For example, heat for vaporizing the cryogenic liquid fuel in the vaporizer may be supplied from one or more of several sources, such as, for example, the gas turbine exhaust 99, compressor 105, high pressure turbine 155, low pressure turbine 157, fan bypass 107, turbine cooling air, lubricating oil in the engine, aircraft system avionics/electronics, or any source of heat in the propulsion system 100. Due to the exchange of heat that occurs in the vaporizer 60, the vaporizer 60 may be alternatively referred to as a heat exchanger. The heat exchanger portion of the vaporizer 60 may include a shell and tube type heat exchanger, or a double pipe type heat exchanger, or fin-and-plate type heat exchanger. The hot fluid and cold fluid flow in the vaporizer may be co-current, or counter-current, or a cross current flow type. The heat exchange between the hot fluid and the cold fluid in the vaporizer may occur directly through a wall or indirectly, using an intermediate work fluid.

Figure 2A:
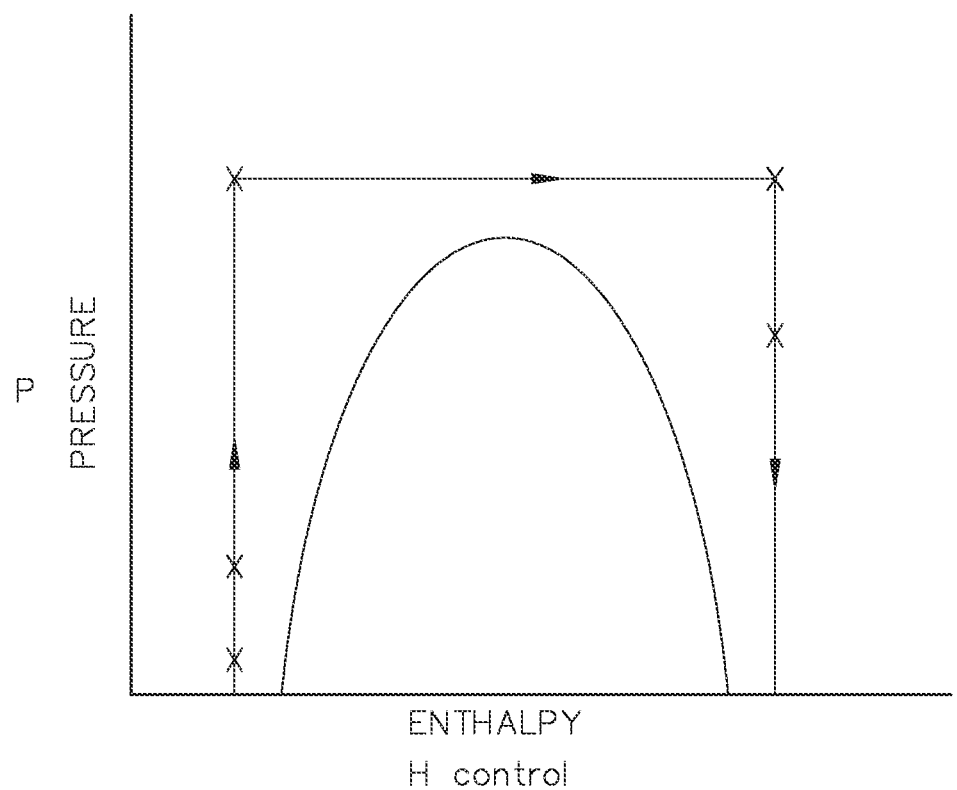
FIG. 2a is an exemplary operating path in a schematic pressure-enthalpy chart of an exemplary cryogenic fuel.

The cryogenic fuel delivery system 50 comprises a flow metering valve 65 ("FMV", also referred to as a Control Valve) that is in flow communication with the vaporizer 60 and a manifold 70. The flow metering valve 65 is located downstream of the vaporizer/heat exchange unit described above. The purpose of the FMV (control valve) is to meter the fuel flow to a specified level into the fuel manifold 70 across the range of operational conditions associated with the gas turbine engine operation. A secondary purpose of the control valve is to act as a back pressure regulator, setting the pressure of the system above the critical pressure of the cryogenic fuel such as LNG. The flow metering valve 65 receives the gaseous fuel 13 supplied from the vaporizer and reduces its pressure to a fourth pressure "P4". The manifold 70 is capable of receiving the gaseous fuel 13 and distributing it to a fuel nozzle 80 in the gas turbine engine 101. In an embodiment, the vaporizer 60 changes the cryogenic liquid fuel 112 into the gaseous fuel 13 at a substantially constant pressure. FIG. 2a schematically shows the state and pressure of the fuel at various points in the delivery system 50.

The cryogenic fuel delivery system 50 further comprises a plurality of fuel nozzles 80 located in the gas turbine engine 101. The fuel nozzle 80 delivers the gaseous fuel 13 into the combustor 90 for combustion. The fuel manifold 70, located downstream of the control valve 65, serves to uniformly distribute gaseous fuel 13 to the gas turbine fuel nozzles 80. In some embodiments, the manifold 70 can optionally act as a heat exchanger, transferring thermal energy from the propulsion system core cowl compartment or other thermal surroundings to the LNG/natural gas fuel. In one embodiment, the fuel nozzle 80 is configured to selectively receive a conventional liquid fuel (such as the conventional kerosene based liquid fuel) or the gaseous fuel 13 generated by the vaporizer from the cryogenic liquid fuel such as LNG. In another embodiment, the fuel nozzle 80 is configured to selectively receive a liquid fuel and the gaseous fuel 13 and configured to supply the gaseous fuel 13 and a liquid fuel to the combustor 90 to facilitate co-combustion of the two types of fuels. In another embodiment, the gas turbine engine 101 comprises a plurality of fuel nozzles 80 wherein some of the fuel nozzles 80 are configured to receive a liquid fuel and some of the fuel nozzles 80 are configured to receive the gaseous fuel 13 and arranged suitably for combustion in the combustor 90.

In another embodiment of the present invention, fuel manifold 70 in the gas turbine engine 101 comprises an optional purge manifold system to purge the fuel manifold with compressor air, or other air, from the engine when the gaseous fuel system is not in operation. This will prevent hot gas ingestion into the gaseous fuel nozzles due to circumferential pressure variations in the combustor 90. Optionally, check valves in or near the fuel nozzles can be used prevent hot gas ingestion in the fuel nozzles or manifold.

In an exemplary dual fuel gas turbine propulsion system described herein that uses LNG as the cryogenic liquid fuel is described as follows: LNG is located in the tank 22, 122 at 15 psia and −265° F. It is pumped to approximately 30 psi by the boost pump 52 located on the aircraft. Liquid LNG flows across the wing 7 via insulated double walled piping 54 to the aircraft pylon 55 where it is stepped up to 100 to 1,500 psia and may be above or below the critical pressure of natural gas/methane. The Liquefied Natural Gas is then routed to the vaporizer 60 where it volumetrically expands to a gas. The vaporizer 60 is sized to keep the Mach number and corresponding pressure losses low. Gaseous natural gas is then metered though a control valve 65 and into the fuel manifold 70 and fuel nozzles 80 where it is combusted in an dual fuel aviation gas turbine system 100, 101, providing thrust to the aircraft system 5. As cycle conditions change, the pressure in the boost pump (30 psi) and the pressure in the HP pump 58 (1,000 psi) are maintained at an approximately constant level. Flow is controlled by the metering valve 65. The variation in flow in combination with the appropriately sized fuel nozzles result in acceptable and varying pressures in the manifold.

The dual fuel system consists of parallel fuel delivery systems for kerosene based fuel (Jet-A, JP-8, JP-5, etc) and a cryogenic fuel (LNG for example). The kerosene fuel delivery is substantially unchanged from the current design, with the exception of the combustor fuel nozzles, which are designed to co-fire kerosene and natural gas in any proportion. As shown in FIG. 2, the cryogenic fuel (LNG for example) fuel delivery system consists of the following features: (A) A dual fuel nozzle and combustion system, capable of utilizing cryogenic fuel (LNG for example), and Jet-A in any proportion from 0- to 100%; (B) A fuel manifold and delivery system that also acts as a heat exchanger, heating cryogenic fuel (LNG for example) to a gas or a supercritical fluid. The manifold system is designed to concurrently deliver fuel to the combustor fuel nozzles in a uniform manner, and absorb heat from the surrounding core cowl, exhaust system, or other heat source, eliminating or minimizing the need for a separate heat exchanger; (C) A fuel system that pumps up cryogenic fuel (LNG for example) in its liquid state above or below the critical pressure and adds heat from any of a number of sources; (D) A low pressure cryo-pump submerged in the cryogenic fuel (LNG for example) fuel tank (optionally located outside the fuel tank.); (E) A high pressure cryo-pump located in the aircraft pylon or optionally on board the engine or nacelle to pump to pressures above the critical pressure of cryogenic fuel (LNG for example). (F) A purge manifold system can optionally employed with the fuel manifold to purge the fuel manifold with compressor CDP air when the gaseous fuel system is not in operation. This will prevent hot gas ingestion into the gaseous fuel nozzles due to circumferential pressure variations. Optionally, check valves in or near the fuel nozzles can prevent hot gas ingestion. (G) cryogenic fuel (LNG for example) lines running from the tank and boost pump to the engine pylons have the following features: (1) Single or double wall construction. (2) Vacuum insulation or optionally low thermal conductivity insulation material such as aerogels. (3) An optional cryo-cooler to recirculate cryogenic fuel (LNG for example) flow to the tank without adding heat to the cryogenic fuel (LNG for example) tank. (H) A high pressure pump located in the pylon or on board the engine. This pump will raise the pressure of the cryogenic fuel (LNG for example) to levels sufficient to inject natural gas fuel into the gas turbine combustor. The pump may or may not raise the pressure of the cryogenic liquid (LNG for example) above the critical pressure (Pc) of cryogenic fuel (LNG for example).

III. A Fuel Storage System

Figure 3:
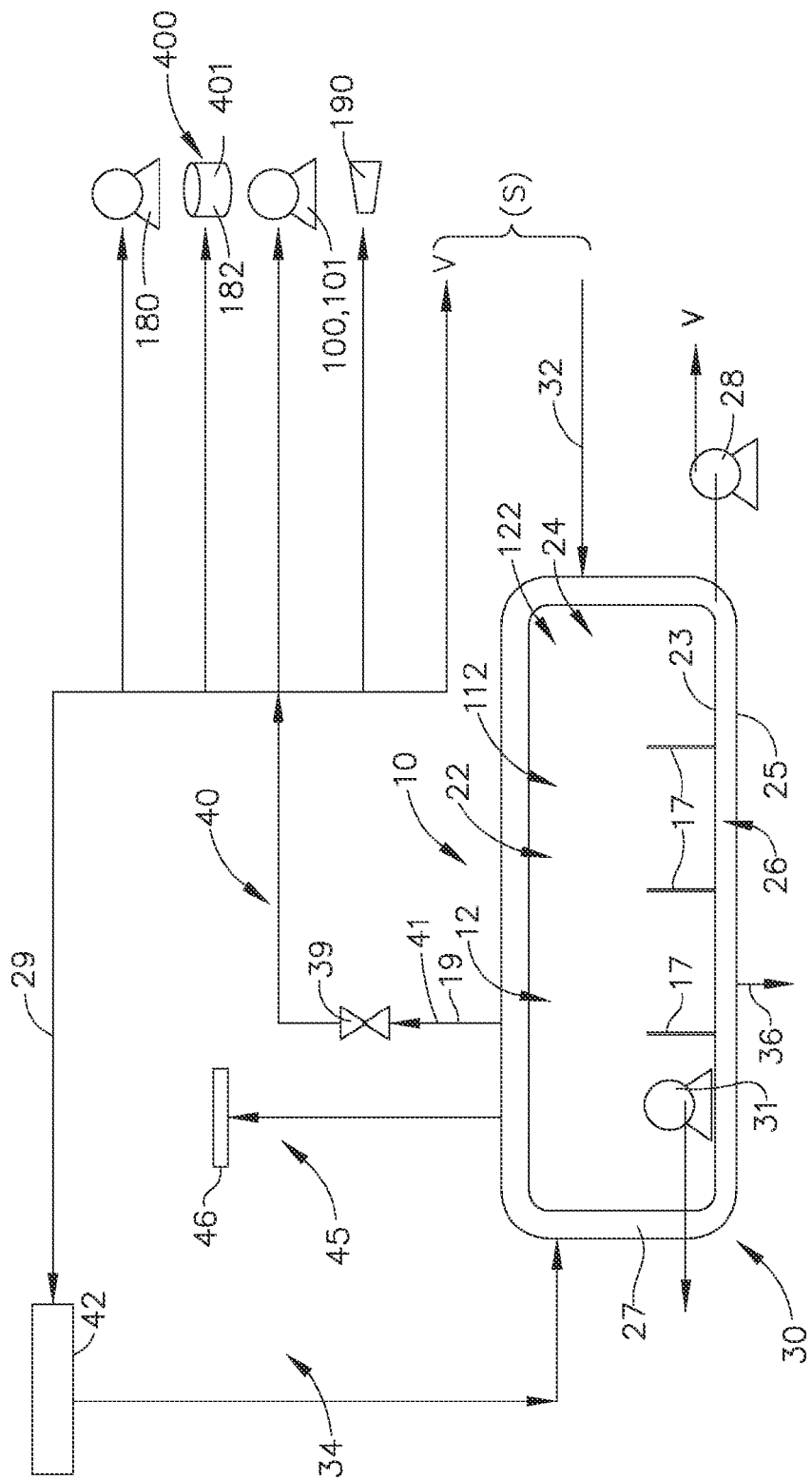
FIG. 3 is a schematic figure showing exemplary arrangement of a fuel tank and exemplary boil off usage.

The exemplary aircraft system 5 shown in FIG. 1 comprises a cryogenic fuel storage system 10, such as shown for example, in FIG. 3, for storing a cryogenic fuel. The exemplary cryogenic fuel storage system 10 comprises a cryogenic fuel tank 22, 122 having a first wall 23 forming a storage volume 24 capable of storing a cryogenic liquid fuel 12 such as for example LNG. As shown schematically in FIG. 3, the exemplary cryogenic fuel storage system 10 has an inflow system 32 capable of flowing the cryogenic liquid fuel 12 into the storage volume 24 and an outflow system 30 adapted to deliver the cryogenic liquid fuel 12 from the cryogenic fuel storage system 10. It further comprises a vent system 40 capable of removing at least a portion of a gaseous fuel 19 (that may be formed during storage) from the cryogenic liquid fuel 12 in the storage volume 24.

The exemplary cryogenic fuel storage system 10 shown in FIG. 3 further comprises a recycle system 34 that is adapted to return at least a portion 29 of unused gaseous fuel 19 into the cryogenic fuel tank 22. In one embodiment, the recycle system 34 comprises a cryo-cooler 42 that cools the portion 29 of unused gaseous fuel 19 prior to returning it into the cryogenic fuel tank 22, 122. An exemplary operation of the cryo-cooler 42 operation is as follows: In an exemplary embodiment, boil off from the fuel tank can be re-cooled using a reverse Rankine refrigeration system, also known as a cryo-cooler. The cryo-cooler can be powered by electric power coming from any of the available systems on board the aircraft system 5, or, by ground based power systems such as those which may be available while parked at a boarding gate. The cryo-cooler system can also be used to re-liquefy natural gas in the fuel system during the dual fuel aircraft gas turbine engine 101 co-fire transitions.

The fuel storage system 10 may further comprise a safety release system 45 adapted to vent any high pressure gases that may be formed in the cryogenic fuel tank 22. In one exemplary embodiment, shown schematically in FIG. 3, the safety release system 45 comprises a rupture disk 46 that forms a portion of the first wall 23. The rupture disk 46 is a safety feature, designed using known methods, to blow out and release any high pressure gases in the event of an over pressure inside the fuel tank 22.

The cryogenic fuel tank 22 may have a single wall construction or a multiple wall construction. For example, the cryogenic fuel tank 22 may further comprise (See FIG. 3 for example) a second wall 25 that substantially encloses the first wall 23. In one embodiment of the tank, there is a gap 26 between the first wall 23 and the second wall 25 in order to thermally insulate the tank to reduce heat flow across the tank walls. In one exemplary embodiment, there is a vacuum in the gap 26 between the first wall 23 and the second wall 25. The vacuum may be created and maintained by a vacuum pump 28. Alternatively, in order to provide thermal insulation for the tank, the gap 26 between the first wall 23 and the second wall 25 may be substantially filled with a known thermal insulation material 27, such as, for example, Aerogel. Other suitable thermal insulation materials may be used. Baffles 17 may be included to control movement of liquid within the tank.

The cryogenic fuel storage system 10 shown in FIG. 3 comprises the outflow system 30 having a delivery pump 31. The delivery pump may be located at a convenient location near the tank 22. In order to reduce heat transfer in to the cryogenic fuel, in an embodiment, the delivery pump may be located in the cryogenic fuel tank 22 as shown schematically in FIG. 3. The vent system 40 vents any gases that may be formed in the fuel tank 22. These vented gases may be utilized in several useful ways in the aircraft system 5. A few of these are shown schematically in FIG. 3. For example at least a portion of the gaseous fuel 19 may be supplied to the aircraft propulsion system 100 for cooling or combustion in the engine. In another embodiment, the vent system 40 supplies at least a portion of the gaseous fuel 19 to a burner and further venting the combustion products from the burner safely outside the aircraft system 5. In another embodiment the vent system 40 supplies at least a portion of the gaseous fuel 19 to an auxiliary power unit 180 that supplies auxiliary power to the aircraft system 5. In another embodiment the vent system 40 supplies at least a portion of the gaseous fuel 19 to a fuel cell 182 that produces power. In another embodiment the vent system 40 releases at least a portion of the gaseous fuel 19 outside the cryogenic fuel tank 22.

The exemplary operation of the fuel storage system, its components including the fuel tank, and exemplary sub systems and components is described as follows.

Natural gas exists in liquid form (LNG) at temperatures of approximately about −260° F. and atmospheric pressure. To maintain these temperatures and pressures on board a passenger, cargo, military, or general aviation aircraft, the features identified below, in selected combinations, allow for safe, efficient, and cost effective storage of LNG. Referring to FIG. 3, these include:

(A) A fuel tank 21, 22 constructed of alloys such as, but not limited to, aluminum AL 5456 and higher strength aluminum AL 5086 or other suitable alloys.

(B) A fuel tank 21, 22 constructed of light weight composite material.

(C) The above tanks 21, 22 with a double wall vacuum feature for improved insulation and greatly reduced heat flow to the LNG fluid. The double walled tank also acts as a safety containment device in the rare case where the primary tank is ruptured.

(D) An alternative embodiment of either the above utilizing lightweight insulation 27, such as, for example, Aerogel, to minimize heat flow from the surroundings to the LNG tank and its contents. Aerogel insulation can be used in addition to, or in place of a double walled tank design.

(E) An optional vacuum pump 28 designed for active evacuation of the space between the double walled tank. The pump can operate off of LNG boil off fuel, LNG, Jet-A, electric power or any other power source available to the aircraft.

(F) An LNG tank with a cryogenic pump 31 submerged inside the primary tank for reduced heat transfer to the LNG fluid.

(G) An LNG tank with one or more drain lines 36 capable of removing LNG from the tank under normal or emergency conditions. The LNG drain line 36 is connected to a suitable cryogenic pump to increase the rate of removal beyond the drainage rate due to the LNG gravitational head.

(H) An LNG tank with one or more vent lines 41 for removal of gaseous natural gas, formed by the absorption of heat from the external environment. This vent line 41 system maintains the tank at a desired pressure by the use of a 1 way relief valve or back pressure valve 39.

(I) An LNG tank with a parallel safety relief system 45 to the main vent line, should an overpressure situation occur. A burst disk is an alternative feature or a parallel feature 46. The relief vent would direct gaseous fuel overboard.

(J) An LNG fuel tank, with some or all of the design features above, whose geometry is designed to conform to the existing envelope associated with a standard Jet-A auxiliary fuel tank such as those designed and available on commercially available aircrafts.

(K) An LNG fuel tank, with some or all of the design features above, whose geometry is designed to conform to and fit within the lower cargo hold(s) of conventional passenger and cargo aircraft such as those found on commercially available aircrafts.

(L) Modifications to the center wing tank 22 of an existing or new aircraft to properly insulate the LNG, tank, and structural elements.

Venting and boil off systems are designed using known methods. Boil off of LNG is an evaporation process which absorbs energy and cools the tank and its contents. Boil off LNG can be utilized and/or consumed by a variety of different processes, in some cases providing useful work to the aircraft system, in other cases, simply combusting the fuel for a more environmentally acceptable design. For example, vent gas from the LNG tank consists primarily of methane and is used for any or all combinations of the following:

(A) Routing to the Aircraft APU (Auxiliary Power Unit) 180. As shown in FIG. 3, a gaseous vent line from the tank is routed in series or in parallel to an Auxiliary Power Unit for use in the combustor. The APU can be an existing APU, typically found aboard commercial and military aircraft, or a separate APU dedicated to converting natural gas boil off to useful electric and/or mechanical power. A boil off natural gas compressor is utilized to compress the natural gas to the appropriate pressure required for utilization in the APU. The APU, in turn, provides electric power to any system on the engine or A/C.

(B) Routing to one or more aircraft gas turbine engine(s) 101. As shown in FIG. 3, a natural gas vent line from the LNG fuel tank is routed to one or more of the main gas turbine engines 101 and provides an additional fuel source to the engine during operation. A natural gas compressor is utilized to pump the vent gas to the appropriate pressure required for utilization in the aircraft gas turbine engine.

(C) Flared. As shown in FIG. 3, a natural gas vent line from the tank is routed to a small, dedicated vent combustor 190 with its own electric spark ignition system. In this manner methane gas is not released to the atmosphere. The products of combustion are vented, which results in a more environmentally acceptable system.

(D) Vented. As shown in FIG. 3, a natural gas vent line from the tank is routed to the exhaust duct of one or more of the aircraft gas turbines. Alternatively, the vent line can be routed to the APU exhaust duct or a separate dedicated line to any of the aircraft trailing edges. Natural gas may be suitably vented to atmosphere at one or more of these locations V.

(E) Ground operation. As shown in FIG. 3, during ground operation, any of the systems can be designed such that a vent line 41 is attached to ground support equipment, which collects and utilizes the natural gas boil off in any ground based system. Venting can also take place during refueling operations with ground support equipment that can simultaneously inject fuel into the aircraft LNG tank using an inflow system 32 and capture and reuse vent gases (simultaneous venting and fueling indicated as (S) in FIG. 3).

IV. Propulsion (Engine) System

FIG. 4 shows an exemplary dual fuel propulsion system 100 comprising a gas turbine engine 101 capable of generating a propulsive thrust using a cryogenic liquid fuel 112. The gas turbine engine 101 comprises a compressor 105 driven by a high-pressure turbine 155 and a combustor 90 that burns a fuel and generates hot gases that drive the high-pressure turbine 155. The combustor 90 is capable of burning a conventional liquid fuel such as kerosene based fuel. The combustor 90 is also capable of burning a cryogenic fuel, such as, for example, LNG, that has been suitably prepared for combustion, such as, for example, by a vaporizer 60. FIG. 4 shows schematically a vaporizer 60 capable of changing the cryogenic liquid fuel 112 into a gaseous fuel 13. The dual fuel propulsion system 100 gas turbine engine 101 further comprises a fuel nozzle 80 that supplies the gaseous fuel 13 to the combustor 90 for ignition. In one exemplary embodiment, the cryogenic liquid fuel 112 used is Liquefied Natural Gas (LNG). In a turbo-fan type dual fuel propulsion system 100 (shown in FIG. 4 for example) the gas turbine engine 101 comprises a fan 103 located axially forward from the high-pressure compressor 105. A booster 104 (shown in FIG. 4) may be located axially between the fan 103 and the high-pressure compressor 105 wherein the fan and booster are driven by a low-pressure turbine 157. In other embodiments, the dual fuel propulsion system 100 gas turbine engine 101 may include an intermediate pressure compressor driven by an intermediate pressure turbine (both not shown in FIG. 4). The booster 104 (or an intermediate pressure compressor) increases the pressure of the air that enters the compressor 105 and facilitates the generation of higher pressure ratios by the compressor 105. In the exemplary embodiment shown in FIG. 4, the fan and the booster are driven by the low pressure turbine 157, and the high pressure compressor is driven the high pressure turbine 155.

Figure 5:
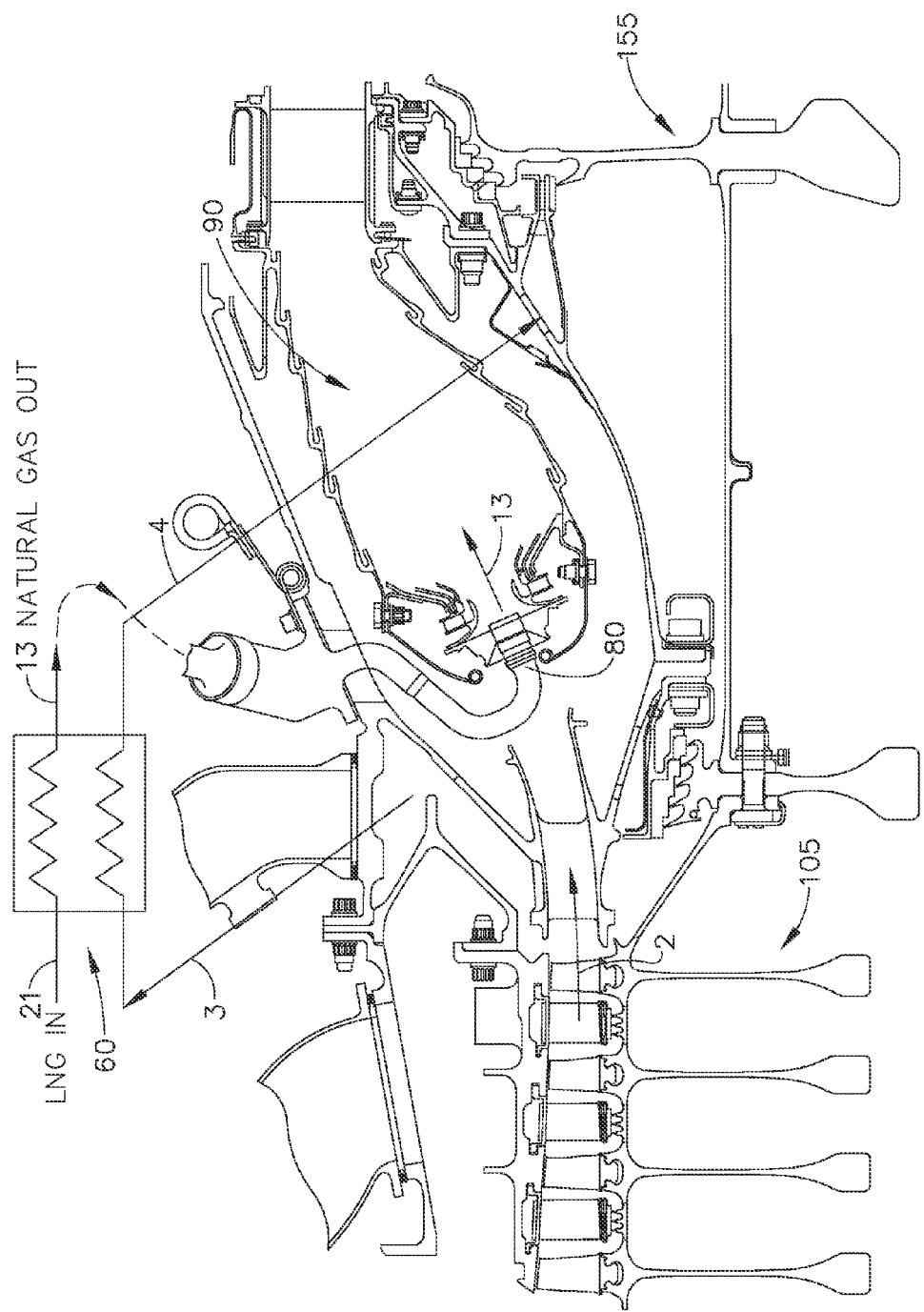
FIG. 5 is a schematic cross-sectional view of a portion of an exemplary dual fuel aircraft gas turbine engine showing a schematic heat exchanger.

The vaporizer 60, shown schematically in FIG. 4, is mounted on or near the engine 101. One of the functions of the vaporizer 60 is to add thermal energy to the cryogenic fuel, such as the liquefied natural gas (LNG) fuel, raising its temperature. In this context, the vaporizer functions as heat exchanger. Another, function of the vaporizer 60 is to volumetrically expand the cryogenic fuel, such as the liquefied natural gas (LNG) fuel to a gaseous form for later combustion. Heat (thermal energy) for use in the vaporizer 60 can come from or more of many sources in the propulsion system 100 and aircraft system 5. These include, but are not limited to: (i) The gas turbine exhaust, (ii) Compressor intercooling, (iii) High pressure and/or low pressure turbine clearance control air, (iv) LPT pipe cooling parasitic air, (v) cooling air used in the High pressure and/or low pressure turbine, (vi) Lubricating oil, and (vii) On board avionics, electronics in the aircraft system 5. The heat for the vaporizer may also be supplied from the compressor 105, booster 104, intermediate pressure compressor (not shown) and/or the fan bypass air stream 107 (See FIG. 4). An exemplary embodiment using a portion of the discharge air from the compressor 105 is shown in FIG. 5. A portion of the compressor discharge air 2 is bled out to the vaporizer 60, as shown by item 3 in FIG. 5. The cryogenic liquid fuel 21, such as for example, LNG, enters vaporizer 60 wherein the heat from the airflow stream 3 is transferred to the cryogenic liquid fuel 21. In one exemplary embodiment, the heated cryogenic fuel is further expanded, as described previously herein, producing gaseous fuel 13 in the vaporizer 60. The gaseous fuel 13 is then introduced into combustor 90 using a fuel nozzle 80 (See FIG. 5). The cooled airflow 4 that exits from the vaporizer can be used for cooling other engine components, such as the combustor 90 structures and/or the high-pressure turbine 155 structures. The heat exchanger portion in the vaporizer 60 can be of a known design, such as for example, shell and tube design, double pipe design, and/or fin plate design. The fuel 112 flow direction and the heating fluid 96 direction in the vaporizer 60 (see FIG. 4) may be in a co-current direction, counter-current direction, or they may flow in a cross-current manner to promote efficient heat exchange between the cryogenic fuel and the heating fluid.

Figure 6:
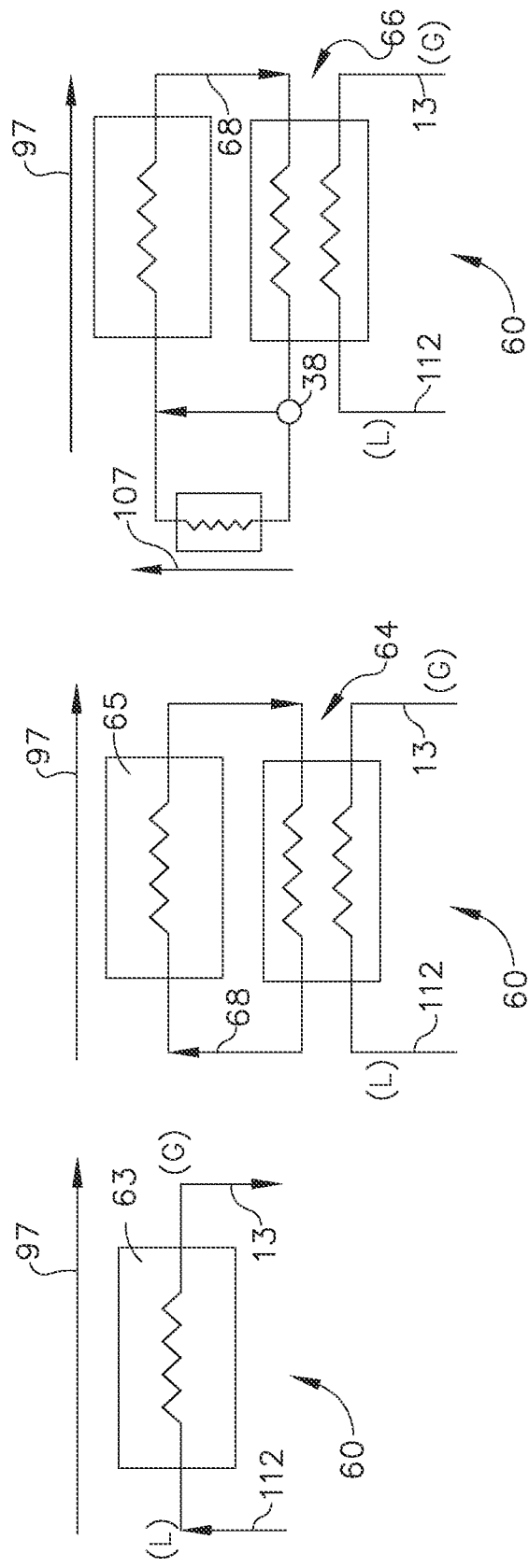
FIG. 6a is a schematic view of an exemplary direct heat exchanger.
FIG. 6b is a schematic view of an exemplary indirect heat exchanger.
FIG. 6c is a schematic view of another exemplary indirect heat exchanger.

Heat exchange in the vaporizer 60 can occur in direct manner between the cryogenic fuel and the heating fluid, through a metallic wall. FIG. 5 shows schematically a direct heat exchanger in the vaporizer 60. FIG. 6*a* shows schematically an exemplary direct heat exchanger 63 that uses a portion 97 of the gas turbine engine 101 exhaust gas 99 to heat the cryogenic liquid fuel 112. Alternatively, heat exchange in the vaporizer 60 can occur in an indirect manner between the cryogenic fuel and the heat sources listed above, through the use of an intermediate heating fluid. FIG. 6*b* shows an exemplary vaporizer 60 that uses an indirect heat exchanger 64 that uses an intermediary heating fluid 68 to heat the cryogenic liquid fuel 112. In such an indirect heat exchanger shown in FIG. 6b, the intermediary heating fluid 68 is heated by a portion 97 of the exhaust gas 99 from the gas turbine engine 101. Heat from the intermediary heating fluid 68 is then transferred to the cryogenic liquid fuel 112. FIG. 6c shows another embodiment of an indirect exchanger used in a vaporizer 60. In this alternative embodiment, the intermediary heating fluid 68 is heated by a portion of a fan bypass stream 107 of the gas turbine engine 101, as well as a portion 97 of the engine exhaust gas 99. The intermediary heating fluid 68 then heats the cryogenic liquid fuel 112. A control valve 38 is used to control the relative heat exchanges between the flow streams.

(V) Method of Operating Dual Fuel Aircraft System

Figure 7:
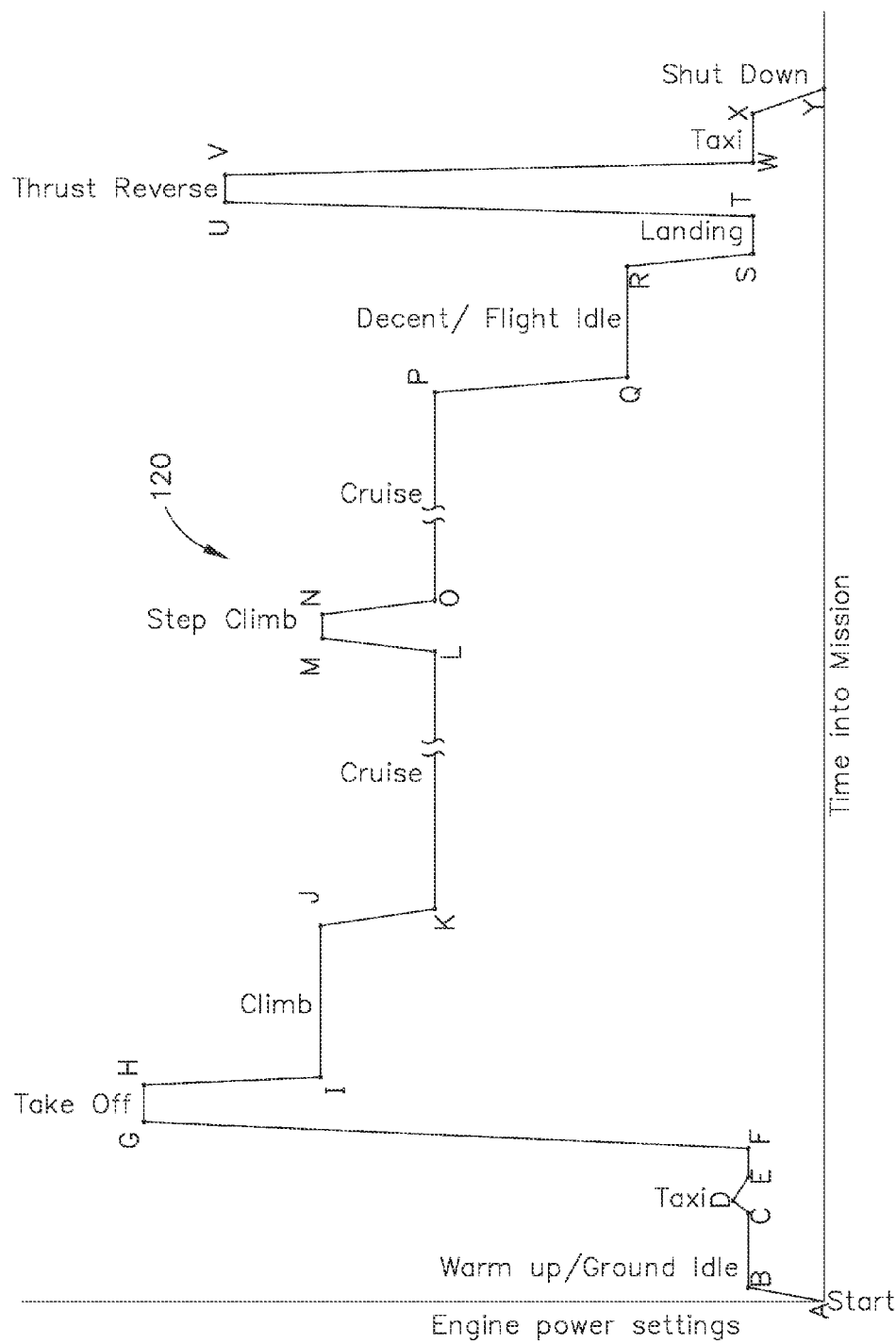
FIG. 7 is a schematic plot of an exemplary flight mission profile for the aircraft system.

An exemplary method of operation of the aircraft system 5 using a dual fuel propulsion system 100 is described as follows with respect to an exemplary flight mission profile shown schematically in FIG. 7. The exemplary flight mission profile shown schematically in FIG. 7 shows the Engine power setting during various portions of the flight mission identified by the letter labels A-B-C-D-E- . . . -X-Y etc. For example, A-B represents the start, B-C shows ground-idle, G-H shows take-off, T-L and O-P show cruise, etc. During operation of the aircraft system 5 (See exemplary flight profile 120 in FIG. 7), the gas turbine engine 101 in the propulsion system 100 may use, for example, the first fuel 11 during a first selected portion of operation of propulsion system, such as for example, during take off. The propulsion system 100 may use the second fuel 12, such as, for example, LNG, during a second selected portion of operation of propulsion system such as during cruise. Alternatively, during selected portions of the operation of the aircraft system 5, the gas turbine engine 101 is capable of generating the propulsive thrust using both the first fuel 11 and the second fuel 12 simultaneously. The proportion of the first fuel and second fuel may be varied between 0% to 100% as appropriate during various stages of the operation of the dual fuel propulsion system 100.

An exemplary method of operating a dual fuel propulsion system 100 using a dual fuel gas turbine engine 101 comprises the following steps of: starting the aircraft engine 101 (see A-B in FIG. 7) by burning a first fuel 11 in a combustor 90 that generates hot gases that drive a gas turbine in the engine 101. The first fuel 11 may be a known type of liquid fuel, such as a kerosene based Jet Fuel. The engine 101, when started, may produce enough hot gases that may used to vaporize a second fuel, such as, for example, a cryogenic fuel. A second fuel 12 is then vaporized using heat in a vaporizer 60 to form a gaseous fuel 13. The second fuel may be a cryogenic liquid fuel 112, such as, for example, LNG. The operation of an exemplary vaporizer 60 has been described herein previously. The gaseous fuel 13 is then introduced into the combustor 90 of the engine 101 using a fuel nozzle 80 and the gaseous fuel 13 is burned in the combustor 90 that generates hot gases that drive the gas turbine in the engine. The amount of the second fuel introduced into the combustor may be controlled using a flow metering valve 65. The exemplary method may further comprise the step of stopping the supply of the first fuel 11 after starting the aircraft engine, if desired.

In the exemplary method of operating the dual fuel aircraft gas turbine engine 101, the step of vaporizing the second fuel 12 may be performed using heat from a hot gas extracted from a heat source in the engine 101. As described previously, in one embodiment of the method, the hot gas may be compressed air from a compressor 155 in the engine (for example, as shown in FIG. 5). In another embodiment of the method, the hot gas is supplied from an exhaust nozzle 98 or exhaust stream 99 of the engine (for example, as shown in FIG. 6a).

The exemplary method of operating a dual fuel aircraft engine 101, may, optionally, comprise the steps of using a selected proportion of the first fuel 11 and a second fuel 12 during selected portions of a flight profile 120, such as shown, for example, in FIG. 7, to generate hot gases that drive a gas turbine engine 101. The second fuel 12 may be a cryogenic liquid fuel 112, such as, for example, Liquefied Natural Gas (LNG). In the method above, the step of varying the proportion of the first fuel 12 and the second fuel 13 during different portions of the flight profile 120 (see FIG. 7) may be used to advantage to operate the aircraft system in an economic and efficient manner. This is possible, for example, in situations where the cost of the second fuel 12 is lower than the cost of the first fuel 11. This may be the case, for example, while using LNG as the second fuel 12 and kerosene based liquid fuels such as Jet-A fuel, as first fuel 11. In the exemplary method of operating a dual fuel aircraft engine 101, the proportion (ratio) of amount of the second fuel 12 used to the amount of the first fuel used may be varied between about 0% and 100%, depending on the portion of the flight mission. For example, in one exemplary method, the proportion of a cheaper second fuel used (such as LNG) to the kerosene based fuel used is about 100% during a cruise part of the flight profile, in order to minimize the cost of fuel. In another exemplary operating method, the proportion of the second fuel is about 50% during a take-off part of the flight profile that requires a much higher thrust level.

The exemplary method of operating a dual fuel aircraft engine 101 described above may further comprise the step of controlling the amounts of the first fuel 11 and the second fuel 12 introduced into the combustor 90 using a control system 130. An exemplary control system 130 is shown schematically in FIG. 4. The control system 130 sends a control signal 131 (S1) to a control valve 135 to control the amount of the first fuel 11 that is introduced to the combustor 90. The control system 130 also sends another control signal 132 (S2) to a control valve 65 to control the amount of the second fuel 12 that is introduced to the combustor 90. The proportion of the first fuel 11 and second fuel 12 used can be varied between 0% to 100% by a controller 134 that is programmed to vary the proportion as required during different flight segments of the flight profile 120. The control system 130 may also receive a feed back signal 133, based for example on the fan speed or the compressor speed or other suitable engine operating parameters. In one exemplary method, the control system may be a part of the engine control system, such as, for example, a Full Authority Digital Electronic Control (FADEC) 357. In another exemplary method, a mechanical or hydromechanical engine control system may form part or all of the control system.

The control system 130, 357 architecture and strategy is suitably designed to accomplish economic operation of the aircraft system 5. Control system feedback to the boost pump 52 and high pressure pump(s) 58 can be accomplished via the Engine FADEC 357 or by distributed computing with a separate control system that may, optionally, communicate with the Engine FADEC and with the aircraft system 5 control system through various available data busses.

The control system, such as for example, shown in FIG. 4, item 130, may vary pump 52, 58 speed and output to maintain a specified pressure across the wing 7 for safety purposes (for example at about 30-40 psi) and a different pressure downstream of the high pressure pump 58 (for example at about 100 to 1500 psi) to maintain a system pressure above the critical point of LNG and avoid two phase flow, and, to reduce the volume and weight of the LNG fuel delivery system by operation at high pressures and fuel densities.

In an exemplary control system 130, 357, the control system software may include any or all of the following logic: (A) A control system strategy that maximizes the use of the cryogenic fuel such as, for example, LNG, on takeoff and/or other points in the envelope at high compressor discharge temperatures (T3) and/or turbine inlet temperatures (T41); (B) A control system strategy that maximizes the use of cryogenic fuel such as, for example, LNG, on a mission to minimize fuel costs; (C) A control system 130, 357 that re-lights on the first fuel, such as, for example, Jet-A, only for altitude relights; (D) A control system 130, 357 that performs ground starts on conventional Jet-A only as a default setting; (E) A control system 130, 357 that defaults to Jet-A only during any non typical maneuver; (F) A control system 130, 357 that allows for manual (pilot commanded) selection of conventional fuel (like Jet-A) or cryogenic fuel such as, for example, LNG, in any proportion; (G) A control system 130, 357 that utilizes 100% conventional fuel (like Jet-A) for all fast accels and decels.

Utilization of natural gas as an aviation fuel in any form (LNG, CNG, etc.) requires the design and implementation of aircraft and engine purge systems that will ensure proper management of any residual quantities of fuel in delivery lines, manifolds, and/or on-board fuel storage containers. Reliability, weight, and simplicity are key metrics in the design of these systems. Purging of liquefied natural gas lines before and after operation is critical to the aircraft system safety. As the LNG warms and goes through phase change (boils) from liquid to vapor its specific volume (cubic feet per pound) increases dramatically. If allowed to warm in a closed line or vessel, the pressure will raise to extreme levels possibly causing rupture and loss of fuel containment with potentially highly undesirable consequences. In ground based power generation turbine engines, purging of natural gas fuel manifolds and fuel nozzles on the engine is commonly done using special valves and routing engine compressor discharge air to the fuel manifold. In other designs, high pressure steam is used to purge the manifold and nozzles. These solutions are not practical in an aircraft application. Typically, the natural gas is being delivered to the engine in the gas phase for a ground based engine. In an aircraft, the fuel is in the liquid phase and is vaporized after reaching the engine. The supply lines which contain the liquid must be purged after operation on the LNG is stopped. An inert gas is needed for the purge. It is highly undesirable to purge with air unless the purge is going directly into the engine combustor. In an embodiment, a non-combustible mixture is kept in the tank ullage and in the supply lines when not in use or when empty and not vented to the atmosphere.

Over the past 10-15 years, OBIGGS (On Board Inert Gas Generating System) technologies have rapidly advanced for use in both the military and commercial sectors. OBIGGS systems that use hollow fiber, membrane, pressure swing adsorption, and other techniques have been developed and deployed as operational products in aircraft of all shapes and sizes. All of these concepts separate oxygen and nitrogen, creating two physically separate and distinct streams including a nitrogen rich stream, sometimes referred to as nitrogen enriched air (NEA) used for on board inerting of fuel tanks and an oxygen rich stream that can be used for secondary purposes or dumped overboard. Manufacturers of OBIGGS systems include but are not limited to Honeywell, Parker-Hannifin, Air Liquide, and publicly quoted separation levels can go as high as 99% Nitrogen purity.

The technology described herein integrates this technology into a dual fuel (LNG and Jet-A) or an all LNG aircraft to ensure that flammable mixtures of natural gas and air do not accumulate in any on board aircraft or engine systems. OBIGGS systems integration into an LNG powered aircraft requires a unique and substantially different architecture versus a conventional Jet-A or JP-8 powered aircraft. Utilization of OBIGGS in the manner described for LNG/natural gas powered aircraft is completely unique and different and has never before been described.

Figure 8:
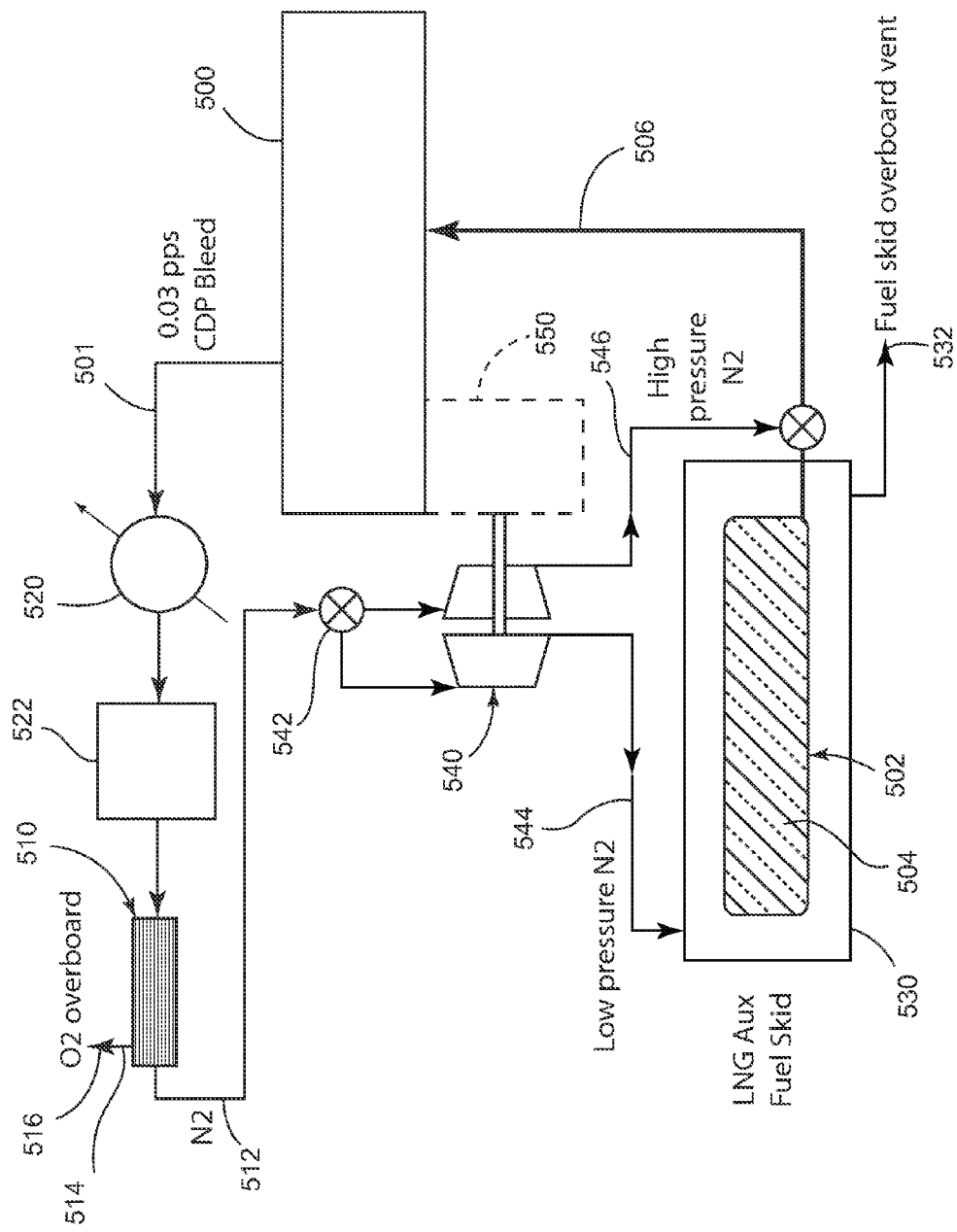
FIG. 8 illustrates a specific inerting system embodiment.

FIG. 8 shows one embodiment in a simplified schematic of the integrated system. An aircraft 5 may include a turbine engine 500 having a bleed air output line 501, a cryogenic fuel system 502 having a cryogenic fuel tank 504 for storing cryogenic fuel and a supply line 506 operably coupling the cryogenic fuel tank 504 to the turbine engine 500. An on board inert gas generating system (OBIGGS) 510 may be fluidly coupled to the bleed air output 501 and as described above may have a nitrogen rich stream output line 512 and an oxygen rich stream output line 514. The oxygen rich stream output line 514 is illustrated as venting overboard as indicated at 516.

A heat exchanger 520 may be fluidly located between the turbine engine 500 and the OBIGGS 510. The bleed air output line 501 may route through the heat exchanger 520. While one heat exchanger 520 has been illustrated it is contemplated that any number of heat exchangers may be included. In this manner, compressor discharge pressure or other bleed air from the turbine engine 500 may be routed through one or more heat exchangers to cool off air to 200° F. or lower, which may be consistent with OBIGGS manufacturer's requirements. This may be done with a minimal loss of pressure. Heat exchanger(s) that may be used to reduce air temperatures to acceptable levels include the engine pre-cooler, external ram air, engine fan air using a variety of means, Jet-A or LNG fuel, Engine lubricating oil, and/or any other heat sink available to the turbine engine 500 or aircraft 5. A water and particle filter 522 may also be included upstream of the OBIGGS 510.

The cryogenic fuel tank 504 has been illustrated as being located within a compartment 530, which may also be known as an LNG fuel skid. The nitrogen rich stream output line 512 may be fluidly coupled with the compartment 530. The compartment 530 may also include an overboard vent 532. Any suitable overboard vent 532 may be used including a check valve type design. The nitrogen rich stream output line 512 may also be fluidly coupled with the fuel delivery line 506 located just upstream of the cryogenic fuel tank 504.

It is contemplated that when the nitrogen rich purge stream is routed to the compartment 530, low pressure may be needed. To achieve this low pressure, the nitrogen purge may be passed through an expansion valve or alternatively a turbine, which will extract work from the nitrogen purge stream. Thus, an expansion valve or turbine may be fluidly coupled to the nitrogen rich stream output line 512 upstream of the compartment 530. Either may be configured to lower a pressure of the nitrogen rich stream provided to the compartment 530. While the option to use an expansion valve is simpler it does not capture any work.

When it is necessary to purge fuel lines 506, the nitrogen rich stream must be re-pressurized to a level that exceeds the compressor discharge pressure. To accomplish this, a small compressor can be used which can extract power via the engine AGB 550, or alternatively from aircraft electrical power or alternatively directly from the engine IDG. The type of compressor can be of any variety. In the illustrated example, a turbocompressor 540 has been illustrated as being included. A control valve 542 may control whether nitrogen is directed to be de-pressurized or pressurized accordingly. In this manner, the controller valve 542 may control the flow of nitrogen to a low pressure line 544 or a high pressure line 546. An additional potential use of OBIGGS nitrogen is to use a small amount of OBIGGS high pressure nitrogen discharged from the compressor, to pressurize one or more LNG fuel tanks to levels required for feeding the aircraft engine, such fluid lines are not illustrated for simplicity.

During operation, when the fuel system is not in transition to LNG from Jet-A or from LNG to Jet-A, all of the nitrogen rich bleed may be routed to the LNG fuel tank compartment(s) 530 to purge these compartments 530 of any small amounts of natural gas fuel that has accumulated in these compartments 530. After injection into the LNG fuel compartment 530, "spent" nitrogen is dumped overboard through the vent 532 along with any trace amounts of fuel or air that have accumulated in the LNG fuel compartment 530. When LNG/natural gas fueling is initiating or completing, i.e. transitioning to or from a Jet-A only fuelled mode, the nitrogen rich stream may be routed into the fuel delivery line 506. Nitrogen purges the lines that go from the LNG tank 504 to fuel control valves, vaporizer(s), manifolds, fuel nozzles, etc into the aircraft engine combustor. The Nitrogen may go through the entire natural gas fuel system. This process takes anywhere from 1 second to 5 minutes.

The above described embodiments provide a variety of benefits including that the use of an OBIGGS reduces the supply logistics associated with bottled inert gas. Handling of consumable stocks of anything adds to the manpower costs associated with the associated activity. The OBIGGS will eliminate the need to resupply or recharge high pressure gas bottles. In addition, the weight and volume associated with the inert gas bottles should be significantly reduced with an OBIGGS that has been carefully integrated into the aircraft propulsion and power systems. In addition, by using an OBIGGS system on an LNG fueled aircraft, weight is greatly reduced versus the utilization of high pressure nitrogen tanks or, alternatively, liquid nitrogen containers. Further, reliability is enhanced as OBIGGS systems have demonstrated operating lives between overhaul of 5-7 years or more. Further still, mixtures of natural gas in liquid or gaseous form are completely eliminated using this technology, resulting in natural gas powered aircraft that are safer than today's Jet-A powered legacy versions. Further still, multiple OBIGGS systems can be designed and carried on board the aircraft including one system per engine. It is contemplated that redundancy can be achieved so that one system can be sized to meet the entire aircraft needs if necessary.

Figure 9:
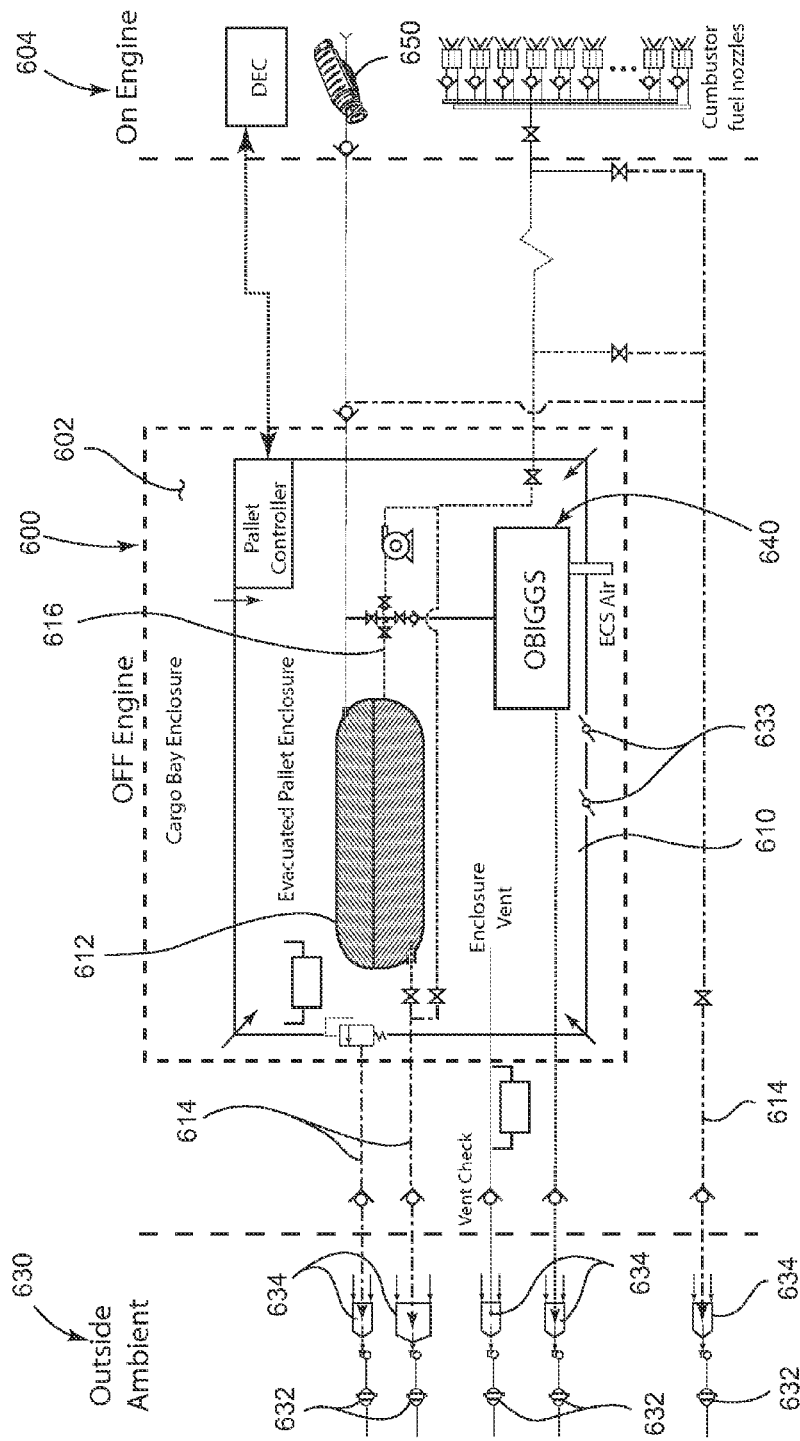
FIG. 9 illustrates an exemplary ventilation and purge system embodiment.

FIG. 9 illustrates a retrofit cryogenic fuel system 600 for an aircraft having a cargo bay 602 and a turbine engine, generally indicated at 604, fueled by the cryogenic fuel. An evacuated enclosure 610 may be included in the retrofit cryogenic fuel system 600 and may be configured to be received within the cargo bay 602. A cryogenic fuel tank 612 may be located within a fuel skid enclosure or evacuated enclosure 610. The enclosure 610 may house multiple cryogenic fuel tanks 612 as well as auxiliary components thereof. This enclosed fuel skid along with modifications to the turbine engine 604 may enable operation of the turbine engine 604 on both cryogenic as well as jet fuels.

At least one vent line 614 or fuel supply line 616 may be fluidly coupled to the evacuated enclosure 610. At least one vent line 614 may be fluidly coupled to ambient air external to the cargo bay 602, generally indicated at 630, when the enclosure 610 is received within the cargo bay 602. It is contemplated that multiple vent lines 614 may connect the enclosure 610 directly to the ambient external to the aircraft and vent the ambient internal to the enclosure 610 directly to atmosphere 630. These vent lines 614 may be designed to maintain negative pressure within in the enclosure 610 ensuring no VOC leaks out of the enclosure 610 into the cargo bay 602. It is contemplated that all process vent and purge lines will be routed to the ambient outside of the plane. Further, all lines connecting the enclosure 610 to the external atmosphere 630 may be continuous and without joints to prevent leakage in the cargo bay 602. The fuel line 616 may also be continuous without a joint. All lines may include flame or lightening arrestors 632 at the exits to avoid arcing and sparking. In addition, the exit of every line may include an ejector mechanism 634 to create suction and an evacuated pressure condition within the line and enclosure to avoid leakage in the cargo bay 602. Additionally, the enclosure 610 may be equipped with suction fans (not shown) to enable an evacuated ambient while the aircraft is still on the ground without the required velocity to activate the ejector mechanism 634.

Furthermore, vent dampers 633 plumbed to the external atmosphere may be added to the enclosure to be deployed in case of a cryogenic fluid leak to avoid an overpressure event. Moreover, the skid floor may be equipped with drain lines (not shown) plumbed to outside the aircraft to jettison any leaking cryogenic fuel quickly and reduce the potential volume of evaporated fuel. This leads to a reduction in the size of vent dampers.

An inert gas generation system such as an OBIGGS 640 may be selectively coupled to the at least one fuel line to purge the fuel line. The OBIGGS 640 may also be included within the enclosure 610 and may be operated to allow purging of all fuel process lines with inert Nitrogen gas as needed during start up, fuel transfer, and shut down. The enriched Oxygen resulting from the OBIGGS process, as well as all lines being purged with inert gas will also be plumbed to outside the plane and equipped with the equipment described above to maintain zero leakage of VOC into the cargo bay 602. VOC may also be sent to a catalytic convertor 650 to be neutralized and mitigate the emission of greenhouse gases to atmosphere.

The above described embodiments provide a variety of benefits including that a significant advantage of utilizing an evacuated enclosure is preventing the chances of Volatile Organic Compound (VOC) leakage to the cargo bay 602. Preventing VOC leakage into the cargo bay 602 reduces the need for extensive modifications to the cargo bay 602 if it had to be treated as a fuel leakage or fire suppression zone. One of the main problems with creating a retrofit dual fuel kit for an existing cargo plane is to maintain the scope of modifications to a minimum. In the case of cryogenic fuels based on the specialized tank and the space required for it, the fuel skid and its auxiliaries must be maintained within an enclosure inside the cargo bay of the aircraft. The challenge with placing cryogenic fuels inside an aircraft cargo bay is having a robust VOC leakage prevention scheme, to avoid costly modifications such as the addition of a fire suppression system to the large volume within the cargo bay. Creating an evacuated enclosure within the fuel skid enclosure enables a robust leakage prevention scheme while keeping aircraft modifications to a minimum.

The technical advantage of utilizing an evacuated enclosure for the fuel tank is it will prevent leakage of VOC to the aircraft cargo bay. This presents a weight saving advantage since no modification are required to be made to the cargo bay for fire suppression. It also presents a commercial advantage by reducing the scope of modifications required for conversion of an existing aircraft to enable operation with cryogenic fuels.

Other means or technology could be utilized to create an evacuated enclosure in lieu of an ejector system external to the aircraft, including evacuated fans. The ventilation and purge lines from the fuel skid enclosure could be directed to a different location rather than the aircraft exterior such as the existing Jet A fuel tanks, fuel catalyzer, or a gas burning engine.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft, comprising:
    a turbine engine having a bleed air output line;
    a cryogenic fuel system having a cryogenic fuel tank for storing cryogenic fuel and a supply line operably coupling the tank to the turbine engine, the cryogenic fuel tank being located within a compartment;
    an on board inert gas generating system (OBIGGS) fluidly coupled to the bleed air output line and having a nitrogen rich stream output line and an oxygen rich stream output line, the nitrogen rich stream output line being fluidly coupled with the compartment; and
    a pressure regulation system configured to selectively increase or decrease a pressure in said nitrogen rich stream output line, the pressure regulation system comprising;
        a control valve;
        a low pressure line;
        a high pressure line; and
        an expansion valve or turbine fluidly coupled to the low pressure line upstream of the compartment for lowering a pressure of the nitrogen rich stream provided to the compartment.

2. The aircraft of claim 1, further comprising a heat exchanger fluidly connected between the turbine engine and the OBIGGS and wherein the bleed air output line routes through the heat exchanger.

3. The aircraft of claim 1 wherein the compartment comprises an overboard vent.

4. The aircraft of claim 1, wherein said pressure regulation system further comprises:
    a motor-driven, gear-driven, shaft-driven or turbine-driven compressor fluidly coupled to the high pressure line;
    wherein said high pressure line is fluidly coupled with the supply line located upstream of the cryogenic fuel tank.

5. The aircraft of claim 4 wherein the control valve controls the flow of nitrogen to each of said low pressure line and said high pressure line.

6. The aircraft of claim 1 wherein the aircraft is a dual fuel aircraft fueled by both cryogenic fuel and a kerosene based jet fuel.

7. An aircraft having a retrofit cryogenic fuel system, a cargo bay and a turbine engine fueled by the cryogenic fuel, comprising:
    an evacuated enclosure within the cargo bay;
        a cryogenic fuel tank located within the evacuated enclosure, the cryogenic fuel tank being located within a compartment;
    at least one vent line or fuel supply line fluidly coupled to the evacuated enclosure;
    an on board inert gas generating system (OBIGGS) fluidly coupled to a bleed air output line and having a nitrogen rich stream output line and an oxygen rich stream output line, the nitrogen rich stream output line being fluidly coupled with the compartment; and
    a pressure regulation system configured to selectively increase or decrease the pressure of said nitrogen rich stream, the pressure regulation system comprising;
        a control valve;
        a low pressure line;
        a high pressure line; and
        an expansion valve or turbine fluidly coupled to the low pressure line upstream of the compartment for lowering a pressure of the nitrogen rich stream provided to the compartment.

8. The aircraft of claim 7 wherein at least one of the vent line and the fuel supply line are continuous without a joint.

9. The aircraft of claim 7 wherein the at least one vent line is fluidly coupled to ambient air external to the cargo bay when the evacuated enclosure is received within the cargo bay.

10. The aircraft of claim 7 wherein the at least one vent line comprises an ejector coupling, with the ejector coupling configured to create a suction and an evacuated pressure condition within the line and the evacuated enclosure.

11. The aircraft of claim 7, wherein said nitrogen rich stream output line is selectively coupled to the at least one fuel supply line to purge said at least one fuel supply line.

12. An aircraft, comprising:
    a turbine engine having a bleed air output line;
    a cryogenic fuel system having a cryogenic fuel tank for storing cryogenic fuel and a supply line operably coupling the tank to the turbine engine, the cryogenic fuel tank being located within a compartment;
    an on board inert gas generating system (OBIGGS) fluidly coupled to the bleed air output line and having a nitrogen rich stream output line and an oxygen rich stream output line, the nitrogen rich stream output line being fluidly coupled with the compartment;
    a water and particle filter upstream of said on board inert gas generating system (OBIGGS); and
    a pressure regulation system configured to selectively increase or decrease the pressure of said nitrogen rich stream, the pressure regulation system comprising;
        a low pressure line;

a high pressure line; and
an expansion valve or turbine fluidly coupled to the low pressure line upstream of the compartment for lowering a pressure of the nitrogen rich stream provided to the compartment.

13. The aircraft of claim 12, further comprising a control valve fluidly coupled to said nitrogen rich stream output line;
wherein said control valve is configured to control the flow of nitrogen in said nitrogen rich stream to each of said low pressure line and said high pressure line.

14. The aircraft of claim, 13 wherein said pressure regulation system is downstream of said control valve and upstream of each of said low pressure line and said high pressure line.

15. The aircraft of claim 14 further comprising:
a cargo bay;
an evacuated enclosure within the cargo bay; and
at least one vent line coupled to the evacuated enclosure;
wherein said cryogenic fuel tank is located within the evacuated enclosure.

16. The aircraft of claim 15 wherein said high pressure line is fluidly coupled to said fuel supply line.

17. The aircraft of claim 16 wherein the aircraft is a dual fuel aircraft fueled by both cryogenic fuel and a kerosene based jet fuel.

18. The aircraft of claim 17 further comprising a heat exchanger upstream of said water and particle filter.

\* \* \* \* \*